Aug. 17, 1943.   A. L. BROWN ET AL   2,326,749
POLYMERIZED INSULATING COMPOUND
Filed July 24, 1940
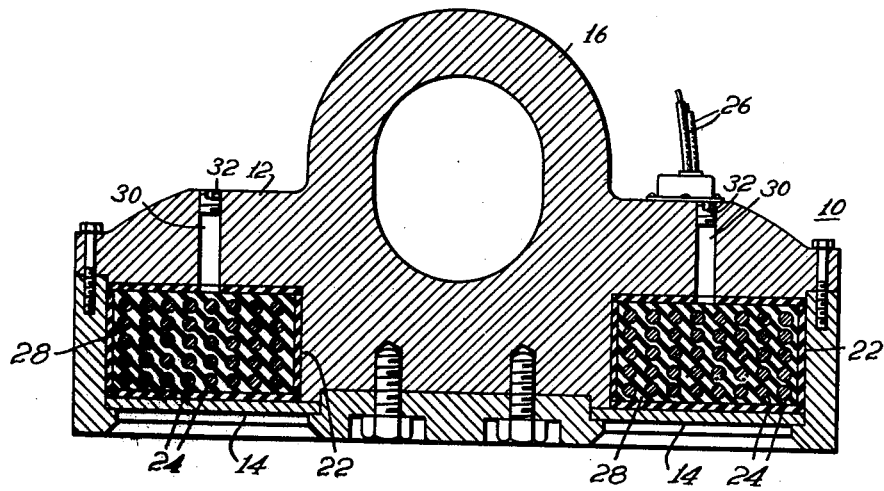
WITNESSES:
INVENTORS
Arthur L. Brown and
William B. Atkinson.
BY
ATTORNEY Patented Aug. 17, 1943

2,326,749

UNITED STATES PATENT OFFICE 2,326,749

POLYMERIZED INSULATING COMPOUND

Arthur L. Brown, Forest Hills, and William B. Atkinson, Pittsburgh, Pa., assignors to Westinghouse Electric & Manufacturing Company, East Pittsburgh, Pa., a corporation of Pennsylvania Application July 24, 1940, Serial No. 347,237

6 Claims. (Cl. 106—250)

This invention relates to polymerized oil, more particularly to a polymerized oil suitable for insulating electrical apparatus.

The insulation of electrical elements within electrical apparatus calls for materials having good dielectric qualities and resistance to both ageing and deterioration due to the effects of temperature. In certain electrical apparatus, such, for example, as lifting electromagnets, the electrical insulation may be subjected to high temperatures for considerable lengths of time. Frequently hot billets and other ferrous materials must be handled with an electromagnet. Such use subjects the electrical insulation including an insulating composition filling to temperatures which will cause the electrical properties to be severely tested. Due to the fact that the amount of insulating filling material required for such apparatus is fairly large, ordinary high temperature insulation or inorganic insulating materials are not economically applicable.

The problem of placing electrical insulating composition material in and around the electrical members of lifting electromagnets and similar apparatus is complicated due to the fact that the apparatus cannot be readily disassembled and an insulating composition filling applied under easily controllable conditions. At best a small filling opening is available through which the electrical insulating composition may be introduced into the apparatus. Entrapped air and voids are a common occurrence in the insulating composition as heretofore employed in such instances.

It is a purpose of the invention to provide an electrical insulating composition employing polymerizable oils such as tung oil and oiticica oil which may be put into apparatus similar to lifting electromagnets under conditions whereby good filling with substantially no voids is had and thereafter effecting a predetermined catalyzed polymerization of the oil to give a high grade electrical insulating solid which will withstand heat and other operating conditions with good results.

The object of this invention is to provide for controlled polymerization of tung and oiticica oils.

A further object of this invention is to provide for a stable catalytic solution for effecting a predetermined polymerization of oils.

The invention, accordingly, comprises the several steps and the relation and order of one or more of such steps with respect to each of the others and the article possessing the features, properties and the relation of the elements which are as provided in the following detailed disclosure and the scope of the application of which will be indicated in the claims.

For a fuller understanding of the nature and objects of the invention, reference may be had to the following detailed description taken in conjunction with the accompanying drawing, in which:

The single figure of drawing is a cross sectional view of an electromagnet employing the insulating composition in accordance with this invention.

The polymerization of tung oil to produce a solid has been known to the prior art. This polymerization has been effected in the prior art by the use of metallic halogens, particularly ferric chloride as a catalyst therefor. However, the action of the ferric chloride has not resulted in a material which is satisfactory from the standpoint of the demands of electrical insulation. The application of ferric chloride directly to tung oil results in a violent reaction which gives a clotted mass which is physically unsuitable for use. The electrical insulating properties of such a mass are extremely poor and it is of little value.

The ferric chloride and similar catalyst have also been put into solution in order that a better admixture of the catalyst with the polymerizable oil may be effected. However, the prior art solvents remained within the final polymerized product and were detrimental in producing a good dielectric body. In addition, sufficient ferric chloride to insure complete reaction and to produce the best type of polymerized solid was so reactive that the polymerization proceeded at a high rate of speed and little or no time was available for the molding or applying of the oil after admixture was effected. If a smaller quantity of ferric chloride were added, the reaction proceeded so slowly that the polymerization reaction had to be completed by the use of heat and other methods. The poor control over the polymerization reaction in these prior art processes severely restricted the use of polymerized oils.

In any event the final product as achieved by the prior art had poor dielectric characteristics with power factors of 15% and higher. The electrical breakdown strength of such resulting polymerized bodies was very low.

According to the invention a predetermined rate and time of initiation of the polymerization of oils is secured by employing a deterrent addition to a catalytic solution that has sufficient polymerization catalyst to produce a homogeneous and mechanically strong elastic solid. Moreover, the electrical insulation properties of the product are of a high order with extremely high breakdown strength.

The basic materials which it is proposed to use in preparing the polymerized solid masses are tung oil and oiticica oil. Other unsaturated oils similar to these may be employed in this connection. The main requirement is that the materials polymerize under the reaction of a metallic halogen catalyst. The tung oil and the oiticica oil may be employed separately or as admixtures and are substantial equivalents. The economic and availability considerations are the main ones which may make one preferable to the other.

Catalysts for causing polymerization of tung and oiticica oil and their subsequent solidification into a mass are known to the prior art. The most common catalyst is ferric chloride though ferric bromide, stannic chloride and other metallic halogens have been used. No extensive list is given here since suitable catalysts are well known to persons skilled in the art.

For electrical purposes it has been found that the catalyst, for example, ferric chloride, should preferably be the anhydrous salt and not the hydrated salt. The presence of water in the final polymerized product is detrimental to the electrical properties and should be avoided.

For putting the catalyst into solution, according to this invention, anhydrous diethyl ether has been successfully used to dissolve anhydrous ferric chloride. A stable, non-settling solution is formed which may be stored indefinitely and does not deteriorate with age. The preparation of this solution is effected in the following manner: 800 cubic centimeters of diethyl ether in a large receptacle are placed in ice water; 346 grams of anhydrous ferric chloride are then added very slowly to the ether with continuous stirring. The heat of solution of these materials is extremely high and care must be exercised to prevent boiling over of the ether. This solution of anhydrous diethyl ether and ferric chloride is the basic catalyzing material for polymerization of the oils.

The above polymerizing catalyst solution is extremely reactive and no good time or rate of polymerization control of the polymerization reaction may be had by using it alone. It has been discovered that a predetermined quantity of castor oil when added to the catalyst solution causes a controlled deterring of the catalyzing action of catalysts such, for example, as ferric chloride. This deterring action is something other than simply the presence of an "indifferent" material. Numerous so-called "indifferent" materials mentioned in the prior art have been tried in this respect and they appear merely to exert a diluting action and not a deterring action of the type produced by the use of castor oil. It has been found that the quantity of castor oil necessary for the purpose of controlling the catalyzing reaction must greatly exceed the amount of catalyst such as ferric chloride. For example, with 346 grams of anhydrous ferric chloride approximately 1½ gallons of castor oil are necessary. This is approximately 16 times the weight of the ferric chloride.

The catalytic solution prepared from ether, ferric chloride and castor oil should be substantially free of water in any form. The catalytic solution remains within the final polymerized product and the presence of water or moisture is detrimental to the electrical properties of the solvent. It is desirable that the solution be substantially anhydrous though minute quantities of moisture may be unavoidably present as a matter of practical operation. The use of substantially anhydrous ingredients will assist in keeping down the amount of moisture of any type to a practical minimum.

For polymerizing 100 lbs. of tung and oiticica oil the amount of anhydrous ferric chloride may range from 1 to 1½ lbs., a preferred quantity being approximately 1⅓ lbs. In some instances the amount of ferric chloride may be more or less than this but the best dielectric material is had with this quantity of ferric chloride. Approximately 2 lbs. of anhydrous diethyl ether solvent for 1⅓ lbs. of ferric chloride will produce a desirable quantity of catalyst for 100 lbs. of polymerized oil. However, the quantity of ether may be varied from 1½ to 3 lbs. Inasmuch as the ether does not take part in the polymerization reaction and simply carries the ferric chloride catalyst into intimate contact with the oil, the use of the lesser quantity of ether is desirable. Approximately 18 to 25 lbs. of castor oil constitute the most satisfactory operating quantity of deterrent for the above amount of ferric chloride and polymerizable oil. However, the preferred quantity of castor oil is approximately 21 lbs. for 1⅓ lbs. of ferric chloride Reduction in the above amount of ferric chloride may be effected if it is compensated for by heating the tung oil. Greater amounts of ferric chloride may be used in some instances where the time of initiation of polymerization is not of the essence.

The catalytic solution comprising the three components as above described, does not deteriorate with age and may be stored indefinitely. In comparison therewith a catalytic solution employing acetone as the solvent for ferric chloride with castor oil as a deterrent must be used within a day or so, otherwise it greatly deteriorates.

In preparing a 10 gallon batch of polymer the quantity of catalytic solution is 1½ gallons of castor oil and 346 grams of ferric chloride which is sufficient to cause good polymerization of 8½ gallons of tung and oiticica oils. A satisfactory method of incorporating the two is as follows: The catalytic solution is stirred into 8½ gallons of oil for about 5 minutes in order to thoroughly disperse the catalytic solution. Since the amount of ferric chloride is relatively high for the amount of polymerizable oil, reaction will occur in from 20 to 40 minutes depending on the room temperature, therefore it will be desirable to immediately fill the electrical apparatus with the composition after mixing. The tung oil mixture is extremely fluid and will impregnate electrical apparatus completely without entrapping air or forming voids if the filling is done promptly. After 20 to 40 minutes, depending on the temperature, the oil begins to set and solidify. For practical purposes the apparatus is filled and left overnight to form a completely polymerized solid. The solid resulting from the polymerization of the oil is a dark, homogeneous and elastic material. Blocks of this material bounce like rubber.

For an example of the application of the above composition reference is made to the single figure of the drawing showing an electromagnet 10. The electromagnet 10 comprises a magnetic iron casing 12 and a sole plate 14 of a substantially non-magnetic material such as, for example, 12% manganese steel. These electromagnets are conventionally suspended from hoists by means of a hook 16. The case 12 of the electromagnet is provided with annular cavity or space 22. Within this space 22 are conductors 24 which may be energized with direct current. Conductors 26 are electrically connected to the conductors 24 and the supply of electricity for energizing the electromagnet may be controlled by means of a suitable switch (not shown) disposed to be actuated by the hoist operator. The conductors 24 are insulated from each other and from the magnetic iron casing by means of the composition filling 28 of the type hereinbefore described.

The polymerizable oil composition is introduced immediately after mixing the catalytic solution with the tung oil and/or oiticica oil through the filling aperture 30 in the iron case. The fluid material readily penetrates and fills in and around the conductors 24. When the annular space has been completely filled, the plug 32 may be applied to prevent entry of moisture. Within a short period of time the composition filling 28 solidifies. If left for several hours or overnight, a dense, homogeneous rubber-like insulation results.

The filling 28 will withstand considerable thermal abuse such as encountered in handling hot billets, croppings and hot rolled steel. Masses of the polymerized oil have been exposed to the air for periods of 5 and 6 hours at temperatures of 150° C. without any noticeable change except for a slight exterior hardening. The interior of the mass remains elastic. Exposure to temperatures of 110° C. for several days has had no noticeable effect whatever on the solid. Therefore, the composition filling is ideal for applications when such temperatures prevail.

The electrical properties of tung oil polymerized by means of an ether-ferric chloride catalyst containing castor oil have been tested. These tests show a dielectric strength of 350 volts per mil for 60 cycle alternating current, a power factor of 6% at 27½° C. and good resistance to arcing. The material exhibited electrical resistivity of 172,000 megohms per centimeter. These electrical characteristics were not available in the prior art polymerized tung oil.

In addition to the improvement in electrical properties, the application of the polymerizable oil to apparatus has been greatly improved. By the use of the catalytic solution embodying the solution of ferric chloride in combination with the castor oil deterrent, the rate of solidification and the time of initiation for the solidification is delayed so that a thorough impregnation of the electrical members may be secured.

In some instances the tung and oiticica oils may be modified by the addition of stearine, ester gum or petroleum pitch up to 25% of the weight of the oil. These additions increase the viscosity of the tung oil and for applications such as the magnet filling above described, the proportion of filler may not be exceeded much above that indicated. However, the electrical properties are improved by the addition of petroleum pitch while the mechanical characteristics are improved in that the solid is more elastic.

The polymerizable composition may be put to other uses than the magnet filling above indicated. Small portable transformers of the type used for neon signs, capacitors, outlet boxes and other applications are uses therefor.

The above polymerizable composition does not require much processing equipment except that of the simplest type. The use of furnaces in order to cause the polymerization to proceed is not required. The cold setting of the polymerizable oil is an advantage over the prior art which generally called for heating for considerable lengths of time in order to cause complete polymerization. Thus it will be seen that an extremely economical method of applying solid insulation has been achieved according to the foregoing process.

Since certain obvious changes may be made in the above procedure and different embodiments of the invention could be made without departing from the scope thereof, it is intended that all matter contained in the above description and drawing shall be taken in connection with the accompanying claims and not in a limiting sense.

We claim as our invention:

1. A composition of matter for use as electrical insulation, comprising a polymerized oil selected from the group of tung oil and oiticica oil, and a polymerizing catalyst solution for the oil, composed of an anhydrous metal halide catalyst, anhydrous diethyl ether for dissolving the catalyst and a deterrent for controlling the time and rate of polymerization, the deterrent consisting of castor oil in an amount greater than that of the catalyst.

2. In electrical apparatus comprising electrical members, a solid dielectric about the electrical members, the solid dielectric comprising a polymerized oil selected from one or more of the group consisting of tung oil and oiticica oil and a catalyst solution for effecting the polymerization of the oil, the catalyst solution composed of an anhydrous metal halide catalyst, anhydrous diethyl ether for dissolving the catalyst and castor oil in an amount greater than that of the catalyst for effecting a predetermined time and rate of polymerization of the oil.

3. In an electromagnet comprising a casing and electrical members within the casing, a dielectric composition surrounding the electrical members in the casing, the composition composed of a polymerizable oil selected from the group consisting of tung oil and oiticica oil, and a catalytic solution for effecting polymerization of the oil, the catalytic solution composed of an anhydrous metal halide catalyst, anhydrous diethyl ether for dissolving the catalyst and castor oil for a deterrent to provide for a predetermined time and rate of polymerization, the composition being introduced into the casing as a liquid mixture capable of filling in the space about the electrical members and thereafter the whole polymerizing into a solid having good dielectric properties.

4. A catalyst solution for effecting polymerization of tung oil and oiticica oil, comprising in combination an anhydrous metal halide catalyst, anhydrous diethyl ether for dissolving the catalyst and a quantity of deterrent greater than the amount of catalyst, the deterrent being castor oil.

5. A catalytic solution for effecting polymerization of tung oil and oiticica oil, comprising, in combination, anhydrous ferric chloride as the polymerizing catalyst, anhydrous diethyl ether for dissolving the ferric chloride and a quantity of castor oil exceeding the amount of the ferric chloride to provide a deterrent for controlling the time and rate of polymerization.

6. A composition of matter comprising, in combination, 100 parts of an oil selected from one or more of the group consisting of tung oil and oiticica oil, 1 to 1½ parts of anhydrous ferric chloride to provide a catalyst for polymerizing the oil, 1½ to 3 parts of anhydrous diethyl ether to provide a solvent for the ferric chloride and 18 to 25 parts of castor oil to provide a deterrent for effecting a predetermined time and rate of polymerization, the whole when combined polymerizing to form an elastic solid having good dielectric properties.

ARTHUR L. BROWN.
WILLIAM B. ATKINSON.